(12) United States Patent
Kommareddi et al.

(10) Patent No.: US 6,906,150 B2
(45) Date of Patent: Jun. 14, 2005

(54) HEAT EXCHANGER POLYMERIZATION REACTORS FOR MANUFACTURING DRAG REDUCING AGENTS

(75) Inventors: Nagesh S. Kommareddi, Broken Arrow, OK (US); Thomas Mathew, Tulsa, OK (US); Jeffrey R. Harris, Tulsa, OK (US); John F. Motier, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/785,285

(22) Filed: Feb. 24, 2004

(65) Prior Publication Data

US 2004/0167300 A1 Aug. 26, 2004

Related U.S. Application Data (63) Continuation-in-part of application No. 10/373,361, filed on Feb. 24, 2003.

(51) Int. Cl.[7] .................................................. C08F 2/00
(52) U.S. Cl. ............................. 526/64; 526/62; 526/88; 526/159; 526/918; 422/131; 422/138; 422/201
(58) Field of Search .............................. 526/62, 64, 88, 526/159, 918; 422/131, 138, 201

(56) References Cited

U.S. PATENT DOCUMENTS

| | | | |
|---|---|---|---|
| 4,058,654 A | 11/1977 | Sutter et al. | |
| 4,527,581 A | 7/1985 | Motier | |
| 4,769,427 A * | 9/1988 | Nowakowsky et al. | ....... 526/64 |
| 4,845,178 A | 7/1989 | Hostetler et al. | |
| 5,449,732 A | 9/1995 | Smith et al. | |
| 5,504,131 A | 4/1996 | Smith et al. | |
| 5,504,132 A | 4/1996 | Smith et al. | |
| 6,160,036 A | 12/2000 | Kommareddi et al. | |
| 6,485,692 B1 * | 11/2002 | Freitag et al. | .............. 422/130 |
| 2004/0225087 A1 * | 11/2004 | Baxter, Jr. et al. | ............ 526/82 |

FOREIGN PATENT DOCUMENTS

WO    WO 02/100532 A1    12/2002

* cited by examiner

*Primary Examiner*—Fred Teskin
(74) *Attorney, Agent, or Firm*—Madan, Mossman & Sriram P.C.

(57) ABSTRACT

Temperature control and efficient heat transfer are important to producing high quality polymer drag reducing agents from alpha-olefin and/or other monomers. Many polymerization reactions are exothermic, and controlling or minimizing the exotherm combined with low reaction temperatures yields high molecular weight and, for poly(alpha-olefins), high quality drag reducing agent polymers. It has been found that a shell and tube heat exchanger-type reactor, with the inner tubes hosting the reaction mixture and a coolant circulating through the shell side gives good temperature control. The use of appropriate release agents helps to keep the inner reaction chambers from building up any polymer residue. These reactors can be operated in a continuous filling and harvesting mode to facilitate the continuous production of polymer drag reducing agent and related formulations.

39 Claims, 2 Drawing Sheets

FIG. 3

HEAT EXCHANGER POLYMERIZATION REACTORS FOR MANUFACTURING DRAG REDUCING AGENTS

CROSS-REFERENCES TO RELATED APPLICATIONS

This application is a continuation-in-part of U.S. Ser. No. 10/373,361 filed Feb. 24, 2003 pending.

FIELD OF THE INVENTION

The invention relates to methods and apparatus for preparing polymers, and most particularly relates, in one non-limiting embodiment, to methods and apparatus for preparing polymers where the polymerization temperature is controlled to thereby produce higher quality polymers, such as those useful as drag reducing agents.

BACKGROUND OF THE INVENTION

The use of polyalpha-olefins and copolymers thereof to reduce the effect of friction ("drag") experienced by a liquid hydrocarbon flowing through a hydrocarbon transportation pipeline is well-known in the art. Reduction of the drag decreases the amount of energy needed to accomplish such flow, and therefore also decreases the costs associated with pumping. These materials, often called drag reducing agents (DRAs), can take various forms, including certain polymers in oil soluble suspensions, emulsions, pellets, gels, microfine powders and particulate slurries. However, particulate slurries that comprise ground polymers are often the least expensive form. The ultimate goal is a DRA that rapidly dissolves in the flowing hydrocarbon and that has a polymer content sufficient to ensure that the desired level of drag reduction is achieved.

The polymers that are most commonly used in preparing DRAs are polyalpha-olefins of carbon chain lengths ranging from 2 to about 40. Typically these polymers are prepared using Ziegler-Natta catalysts and frequently also co-catalysts such as alkyl aluminum compounds. These polymerization reactions tend to be very efficient, producing relatively high yield when carried out in bulk. However, they also tend to be highly exothermic. The exotherm itself creates problems which reduce the usefulness of the product if the exotherm is not effectively alleviated. These problems include, but are not necessarily limited to, a substantial reduction in the polymer molecular weight. Such molecular weight loss can result from even relatively minor deviations from a preselected optimal temperature, and can substantially reduce the efficacy of the polymer in a drag reducing agent formulation.

Those skilled in the art have attempted to reduce or otherwise control this exotherm in order to improve the quality of the polymers being produced. Some attempts to accomplish this have included, for example, carrying out the polymerization reaction in specially designed reaction bottles, wherein reactor layers ostensibly provide a level of protection from oxygen and water as potential sources of polymerization catalyst contamination.

Another method of addressing the exotherm problem for DRA polymers has been to use a screw conveyor as the reactor. This method is, however, ill-suited to producing larger quantities of polymer per batch, since in such cases a large screw conveyor must be used to achieve a commercially acceptable polymerization time. Unfortunately, the larger the conveyor, the less effective is the heat transfer, and the less effective the heat transfer, the poorer the temperature control, and hence, the quality of the final DRA polymer.

Thus, it would be desirable if a method for producing drag reducing agent polymer could be developed that preferably enables relatively tight control and/or overall reduction of the exotherm resulting from polymerization, such that high quality DRA polymers, as well as other polymers which would otherwise encounter similar undesired exotherm problems, can be produced in bulk.

SUMMARY OF THE INVENTION

An object of the invention is to provide an apparatus and method for producing a polymer where the polymerization temperature can be carefully controlled.

Other objects of the invention include providing an apparatus and method for producing a polymer where the polymer can be readily manufactured and removed from the reactor.

In carrying out these and other objects of the invention, there is provided, in one form, a method of preparing a polymer that involves allowing a polymerization mixture to polymerize in at least one closed reaction chamber configured as a linear void space with a linear axis and a cross-section and first and second ends, where the linear void space is surrounded by a chamber wall having an inner chamber surface and an outer heat exchange surface. Coolant is passed over the outer heat exchange surface to remove heat therefrom. The ends of the reaction chamber are opened and essentially all of the polymer is removed from each reaction chamber with a harvesting plunger. The harvesting plunger travels along the linear axis of the void space from the first end to the second end thereof.

In another non-limiting embodiment of the invention, there is provided an apparatus for preparing a polymer that includes at least one closed reaction chamber configured as a linear void space with a linear axis and a cross-section and first and second ends. The linear void space is surrounded by a chamber wall having an inner chamber surface and an outer heat exchange surface, where the first and second ends may be opened and closed. A shell surrounds the outer heat exchange surface for passing coolant over the outer heat exchange surface. At least one harvesting plunger is provided, where the harvesting plunger has a linear axis co-linear with the linear axis of at least one chamber. The harvesting plunger is adapted to travel within the corresponding void space from the first end to the second end along the axes to remove essentially all of the at least partially cured polymer from the chamber.

It will be appreciated that the drawings of this invention are for illustrative purposes only, and are not necessarily to scale or proportion, and that the numbers of components shown are non-limiting and may be more or less than shown in actual apparatus that fall within the scope of this invention.

DETAILED DESCRIPTION OF THE INVENTION

Polymerization of α-olefin monomer(s) with the help of catalysts (in one non-limiting embodiment, a titanium trichloride and aluminum alkyl mixture) at controlled low temperatures leads to the synthesis of ultra-high molecular weight drag reducing agent (DRA) polymers. Temperature control of the exothermic reaction is important to producing high quality DRA polymers. It has been discovered that heat exchangers, with some mechanical modifications, are useful reactors to address the temperature control aspect of the polymerization process. One such implementation is the plate and frame heat exchange reactor where heat exchange plates are sandwiched to create cold reaction chambers, such as that described in U.S. patent application Ser. No. 10/373, 361, incorporated by reference herein. The reactive monomer mixture is charged to these chambers and the polymer is harvested after sufficient conversion is achieved. However, in some embodiments of the apparatus and method described therein, the process involves the repeated opening and closing of the plates for each batch of polymer. This could eventually lead to the weakening of the O-ring material used to seal the plates together, and lead to leakage around the groove where the plates meet. Also, the harvesting of the polymer requires manual intervention to remove or peel the polymer slab off the heat exchange plate surface.

It was found that shell and tube reactors can address the potential O-ring failure problem and also the manual labor issue. It is visualized that in general the shell and tube reactor will be a tube bundle with flanged end connections. Potential sources of chemical leakage are immediately reduced to the two flanged end connections. This is in contrast to a design where every chamber could be a potential leakage source as in some plate and frame reactor embodiments. The end connections will have appropriate fittings known to those skilled in the art to allow for the purging of the tubes with nitrogen to provide an inert atmosphere for the reaction. The reactive mixture will be transferred into a shell and tube reactor, filling up all the tubes simultaneously. Coolant circulated on the shell side of the heat exchanger will keep the reaction exotherm under control. The reaction is then allowed to proceed until the desired conversion levels are attained.

The shell and tube reactor configuration of this invention offers a simple means for the polymer harvesting process. After removing the end fittings, the tube bundle hosting the polymer is mated with a matching plate with solid rods or harvesting plungers. The solid rods or harvesting plungers are arrayed on the plate in the same pattern as the hollow tubes hosting the polymer. The mating process is automated and the polymer is extruded or pushed out of the tubes when the process is complete. Since the polymer has a tendency to stick to metal surfaces, the use of a release agent to coat the inside surface of the tubes may be very important to the successful harvesting of the polymer. Any residual polymer on the tubes will need to be cleaned out before another batch is charged to the reactor. The harvested polymer is then ready for size reduction processes such as granulation and grinding that are well known to those skilled in the art. The resulting particles or powders may be incorporated into a slurry using techniques known to those skilled in the art.

Figure 1:
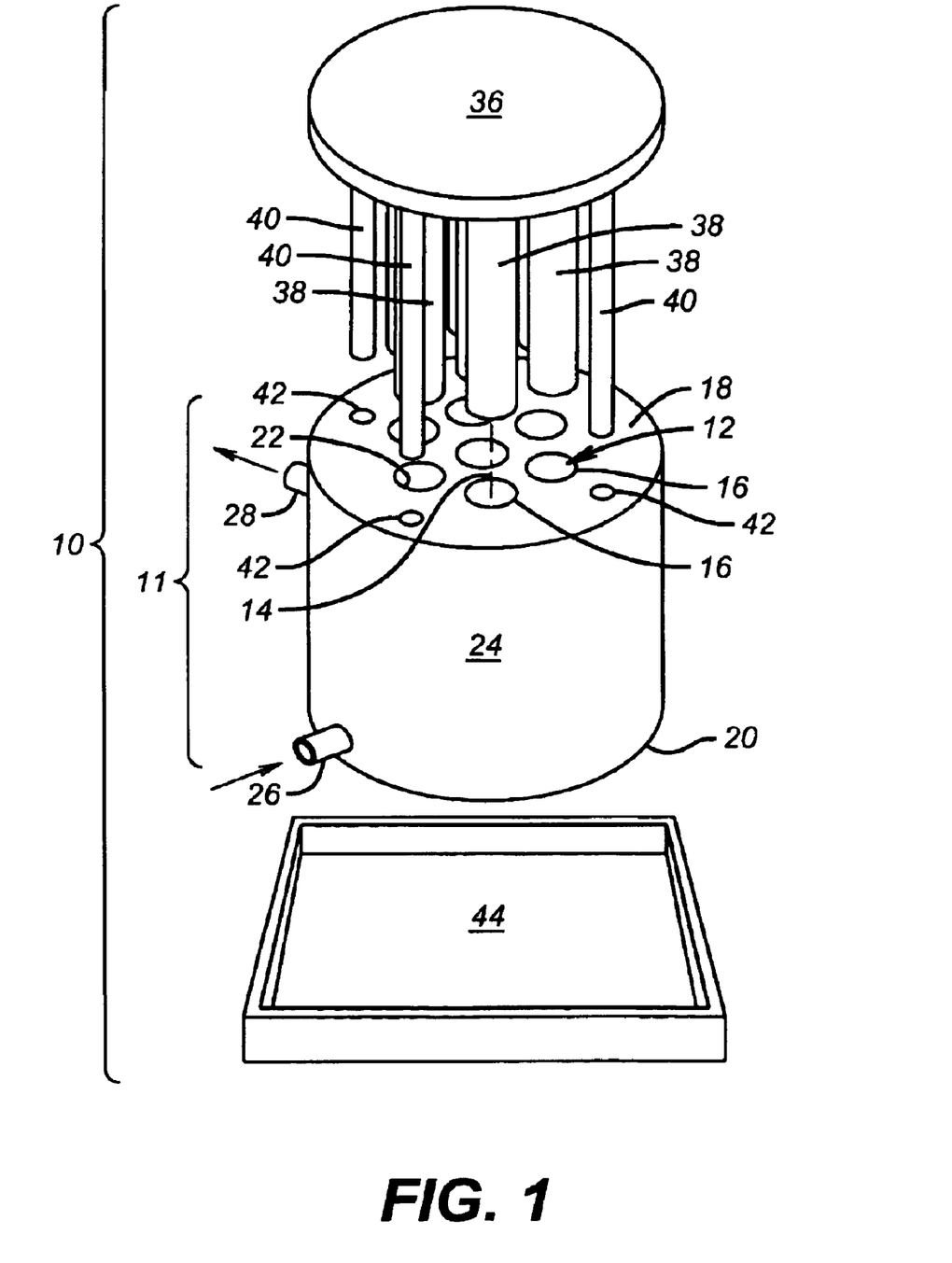
FIG. 1 is a schematic, perspective view of the outside of one embodiment of the polymerization reactor of this invention showing the harvesting plungers poised to remove at least partially cured polymer from the reactor.
Figure 2:
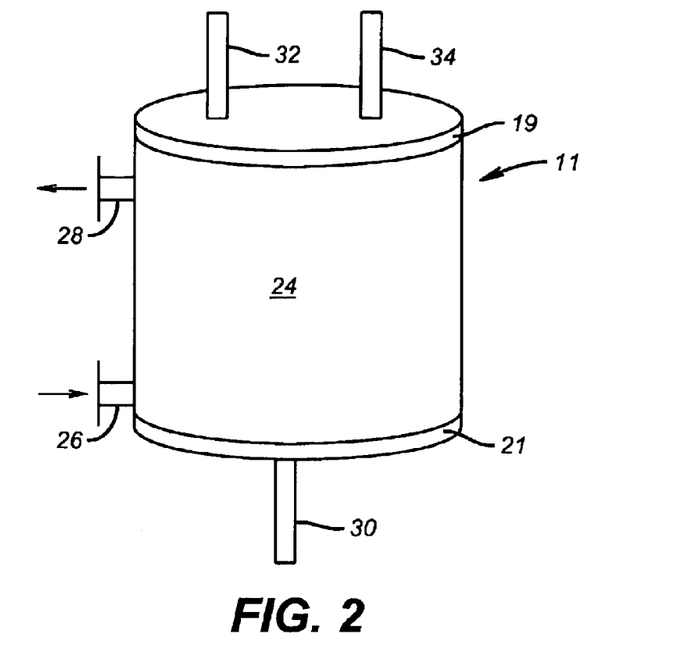
FIG. 2 is a schematic, perspective view of the outside of another embodiment of the polymerization reactor of this invention.

The construction of the shell and tube reactor 11 is similar to a vertical shell and tube heat exchanger with the cooling medium (coolant) on the shell side as shown in FIGS. 1 and 2. It will be appreciated that although the reactor apparatus of the invention are shown in vertical orientations, other orientations are within the scope of this invention, including a horizontal orientation. The polymerization apparatus 10 of this invention includes a shell and tube reactor 11 having at least one reaction chamber 12 configured as a linear void space that has a linear axis 14, a cross-section and first and second ends, as seen in FIG. 1. First ends 16 are shown terminating in top tube sheet 18 in FIG. 1, whereas second ends are not shown, but are in corresponding positions in the bottom tube sheet 20, only shown as the bottom, curved edge. The particular shape of the cross-section of the reaction chambers 12 is not limited to any particular shape, although it is expected that the cross-section of the reaction chambers 12 will be circular due to ease of manufacture and uniform heat transfer from the resulting cylindrical shape of the chambers 12. This design is also conventional for heat exchangers, and the equations for calculating and predicting heat exchange with such a design are well known. Further, although not necessary, it is expected that when more than one reaction chamber 12 is used, the linear axes 14 of the chambers 12 will be parallel. Such an orientation would permit the polymer in all chambers 12 to be removed in the same direction simultaneously.

The linear void space is surrounded by a chamber wall or tube 22 having an inner chamber surface and an outer heat exchange surface (on the shell side). A shell 24 surrounds the outer heat exchange surface so that there is an open cavity through which coolant may pass to contact the outer heat exchange surface, as in the shell side of a conventional shell-and-tube heat exchanger.

The inner chamber surfaces of the tubes or chamber walls 22 should be smooth, optionally polished, and in one non-limiting embodiment made from seamless stainless steel tubes. The tubes should be preferably cold rolled to the tube sheet with no edges. The ends of the tube bundle are capped off with an upper flat head plate 19 and lower flat head plate 21. These end plates 19 and 21 can be secured with quick fix clamps or fly nuts or any other technique and mechanism known in the art. The coolant flows through the hollow shell around the outer heat exchange surfaces and are connected by flexible coolant inlet fitting 26 and flexible coolant outlet fitting 28, as seen in FIGS. 1 and 2. The coolant can be drained from the jacket when cooling is not required. The reaction mixture inlet lines 30 are on the bottom flat head 21. The overflow/vents 32 are on the top flat head 19, as may be an inert gas purge inlet 34.

As shown in FIG. 1, apparatus 10 also includes a plunger head 36 with rods or harvesting plungers 38 of the same orientation of the tubes (e. g. triangular pitch). The plunger head 36 has dowel pins 40 that keep the harvesting plungers 38 on the plunger head 36 aligned with the tubes (FIG. 1) by mating with dowel pin alignment holes 42 in top tube sheet 18. In one non-limiting embodiment, dowel pins 40 may be slightly longer than the harvesting plungers to engage their respective dowel pin alignment holes 42 first. The underside of plunger head 36 may be provided with a stopper (not shown) for the pushing rod assembly or head 36 to engage the top tube sheet 18 or other structure when the plunger head 36 is fully in position. This is to help prevent any damage on the chamber walls 22 to the tube sheet welds due to the impact in a hydraulically operated system during continuous operation of the unit 10. The impact from the raised face on the top frame will be taken by this stopper on the tube sheet. The provision and design of such stoppers is well known in the art.

Figure 3:
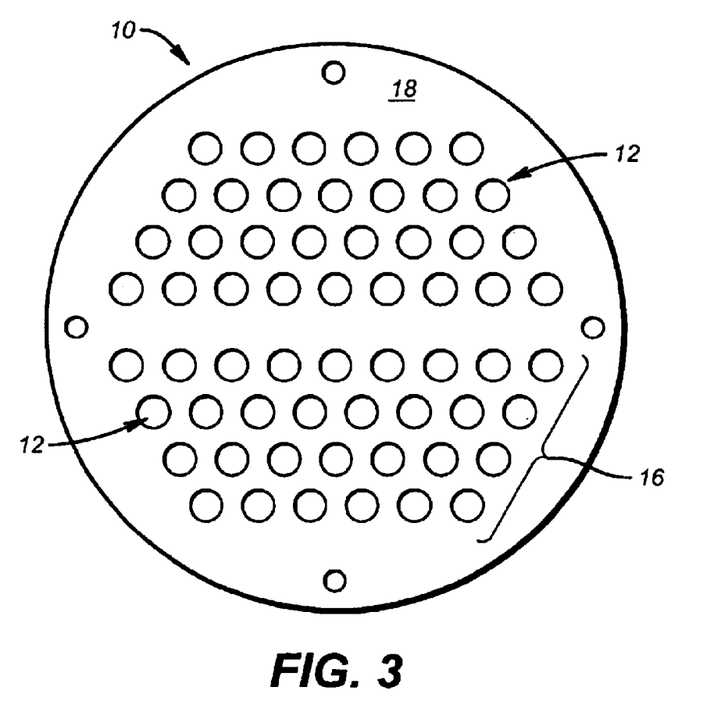
FIG. 3 is top view of an alternate embodiment of the reactor apparatus of this invention showing the first, open ends of the reaction chambers and dowel pin alignment holes, which is similar to a bottom end view of the plunger head containing the harvesting plungers and the dowel pins in corresponding position.

It will be appreciated that the rods or harvesting plungers 38 may have a different orientation other than a triangular pitch. One non-limiting corresponding triangular pitch of the reaction chambers 12 is shown in FIG. 3, and the orientation of the rods or harvesting plungers 38 would be the same as shown. Other orientations or designs, such as a rectangular grid pitch could also be used. It is expected that triangular pitch will likely be commonly used to get the maximum number of tubes within a given circular area of the tube sheet. This design will, in turn, increase the volume of the polymer in the tubes within a specific volume of the total volume of the reactor 11.

It will also be appreciated that the harvesting plungers 38 need not be solid cylinders as shown in FIG. 1 as long as they are elongated and have a surface that contacts the polymer sufficiently to press or push it through the chamber 12. In one non-limiting embodiment harvesting plungers may be a rod attached to a circular plate. While the contact surface of the plunger or plate may be flat, it may be found that other surfaces have advantages (e. g. concave, convex, textured, etc.).

Following the harvesting of the polymer, there may be an optional tube cleaning step or procedure. The equipment for this operation will be similar to the harvesting plunger, but with possibly even closer clearance or tolerance. In one non-limiting embodiment of the invention, the cleaning plunger will have soft brushes on its surface. In another non-limiting embodiment, the cleaning plunger may have the capacity to rotate on its action for better cleaning, if required. Of course, in some non-limiting embodiments of the invention there may be a cleaning plunger for each reaction chamber 12 or a set of cleaning plungers of fewer number than the total number of reaction chambers 12 that service more than one reaction chamber 12 each. In another non-limiting embodiment of the invention, the cleaning operation could be combined with the release agent application operation in a "clean and coat" operation.

Mechanical cleaning of the shell side is not an important concern since generally the coolants that will be used are clean, such as water, glycol/water mixtures, and other common cooling media known to those skilled in the art.

In one non-limiting embodiment of the invention, the diameters of the harvesting plungers 38 may be about 4.0 mm less or so than the diameter of the reaction chambers 12 used to permit the polymer to be pushed or ejected out of the reaction chambers 12. Generally, each harvesting plunger 38 has a cross-section that mates with the cross-section of the linear void space so that a maximum amount of polymer is physically pushed out in the removal operation. By the term "mates" is meant that the harvesting plunger 38 has a cross-sectional area of sufficient shape and dimension to push substantially all the cured polymer from the void space and thus is somewhat smaller than the cross-section of the linear void space to accomplish this purpose. Furthermore, the pattern of the harvesting plungers 38 should mate with and correspond to the pattern of the chambers 12. Additionally, each plunger 38 may be understood to have a linear axis (not shown) which corresponds to and is co-linear with the linear axis 14 of its mating chamber 12, or at least corresponds to and is co-linear with the linear axis of chamber 12 when the polymer therein is harvested. Consequently, it is expected that in most embodiments the axes of the plungers 38 will be parallel to one another to mate with the chambers 12 so that the polymer can be extruded or removed by a force directed in a single direction all at once.

While the diameters of respected reaction chambers 12 do not have to be the same, it is expected that in most cases they will be for ease of manufacture and predictability in removing heat therefrom. Furthermore, it is also expected that the cross-section of reaction chambers 12 will be uniform along their length in most embodiments of the invention, again due to ease of manufacture. By the term "uniform" is meant substantially uniform within manufacturing abilities and tolerances. However, in one non-limiting embodiment of the invention, the cross-section of the reaction chambers 12 could expand or enlarge slightly along its length from the first ends 16 to the second ends thereof to improve the ease with which the cured polymers are ejected or removed. In the case of a circular cross-section, this would mean that the diameter of the reaction chambers 12 would increase or enlarge slightly along the length of the tube. The cross-sections of the plungers 38 would not necessarily also increase along their length.

During operation, the inner chamber surfaces of the chambers 12 may be, and in one non-limiting embodiment preferably are, coated with a polymer release agent, such as a silicone oil. This can be done by dipping a brush or a foam application plunger (not shown) of appropriate diameter or shape into the release agent and sliding the brush back and forth inside the chamber 12 to achieve a uniform coating on the inner chamber surface. Similar to the harvesting plungers 38, the polymer release agent application plunger may have a cross-section in at least one of its structures that mates with the uniform cross-section of the linear void space, i.e. reaction chamber 12. In the case of the application plungers, however, a wider variety of designs could be used including, but not necessarily limited to, a spherical foam piece on a rod, a rectilinear brush or foam block that rotates as it travels through the void space, etc. The linear axis of the application plunger would also be co-linear with the linear axis 14 of the chamber 12 while it is applying release agent thereto. It may be possible to design a subsystem to spray a release agent into chambers 12. The end plates may also be coated with a polymer release agent. The release agent keeps the polymer from sticking to the reactor surfaces and facilitates efficient harvesting of the polymer. The apparatus for applying a mold or polymer release agent to at least the inner chamber surfaces of the chambers 12 is generally described herein as a second subsystem of the apparatus 10. The second subsystem may include an application plunger for each respective chamber or a number of application plungers less than the total number of chambers where any one application plunger applies release agent to more than one chamber in a cycle. By applying release agent to "substantially" the entire inner chamber surface area is meant at least 95% of the interior of reaction chamber 12.

Suitable release agents for use on the inner chamber surfaces include, but are not necessarily limited to liquids, gels, waxes, powders or other microfine particulate, or oil, or an oil- or water-based emulsion or dispersion. More specific examples include, but are not necessarily limited to, silicones, silicone emulsions, polyethylene glycols, polyethylene waxes, polytetrafluoroethylene dispersions, and sleeves made from polyethylene or other suitable polymers. It is preferred that such release agent be selected such that, by virtue of its quantity and/or quality, its presence on the inner surface will not undesirably interfere with the polymerization reaction or the properties or performance of the product polymer. Such release agent can be applied or positioned at an appropriate interval prior to introduction of the polymerization mixture into the chamber.

It is expected that once the apparatus and method is optimized, essentially all of the polymer would be removed by plunger 38 operation. By "essentially all" is meant at least 95% of the polymer in the chamber, alternatively, at least 99% of the polymer.

Using a first subsystem of the apparatus 10, the tube side of the reactor 11 is preferably, in one non-limiting embodiment, purged with an inert gas (in one non-limiting embodiment, nitrogen, or any other commonly available gas inert to the particular polymerization reaction) to displace oxygen and trace amounts of water. In most, if not all, polymerizations of α-olefins, oxygen and water are poisons to the catalysts used and will undesirably halt the reaction prematurely. Depending upon the particular polymerization, the purging medium could be a liquid. The reactor 11 is then cooled down to the desired temperature before filling the reaction chambers 12 with the polymerization reaction mixture. The reaction mixture flows into the tube bundle (collection of the reaction chambers 12) from a bottom channel cover via inlet line 30. The filling time can be calculated from the volume of the tubes and reaction mixture flow rate. Overflow of the resulting polymer from the top vent 32 should be avoided. After filling the reaction mixture in the chambers 12, the inlet 30 and the vents 32 and 34 are capped. The monomer is allowed to convert to polymer at the desired temperature. After a reaction time of approximately 24 hours (or other suitable time, depending upon the particular polymer), the reaction mixture inside the tubes is now of a hard and rubbery texture and it is ready for harvesting.

To begin harvesting the polymer, the coolant flows are cut off and the coolant is drained from the reactor 11. The top and bottom head plates 19 and 21, respectively, then need to be removed. A polymer collection facility (in one non-limiting embodiment tray or conveyor 44) is provided at the bottom of the tube bundle. The top channel cover is replaced by a plunger head 36 generally of the same "footprint" and diameter as reactor 11. As mentioned, the plunger head 36 also has dowel pins 40 fixed thereto (see FIG. 1) that can be aligned to the shell using dowel pin alignment holes 42. Once the dowel pins 40 are in place, the plunger head 36 is mechanically lowered into the tube bundle. The rods on the plunger head 36 essentially act like pistons and push the polymer out from the cylindrical tubes (reaction chambers 12). The polymer rods or cylinders are collected on the tray/conveyor 44 at the bottom, from where they can be transported for size reduction processes like granulation and grinding, which are well known in the art.

In the event the apparatus 10 is equipped with cleaning plunger(s), each reaction chamber 12 is cleaned by a plunger. The cleaning plunger may rotate through the length of the chamber 12 and be equipped with brushes or other structures such as foam pieces to clean the chamber wall or tube 22 of any excess polymer that may remain.

The major advantages of the method and apparatus of this invention include, but are not necessarily limited to, (i) minimal maintenance of reactor equipment is needed, (ii) minimal manual labor is needed to harvest the polymer, (iii) leakage of reactor is greatly minimized, (iv) unlike plastic bottles and bags, the reactor can hold pressure which is needed when handling volatile monomers such as 1-butene, (v) superior heat transfer is provided compared to air cooled systems, and (vi) reactor configuration is suitable for continuous automated polymer production.

It will be appreciated that there is no set number of reaction chambers that could be employed, for example there could only be one, or as shown in the non-limiting embodiment of FIG. 1, there could be 7, or as shown in the embodiment of FIG. 3, there could be 60. It will also be appreciated that there are no particular sizes or values or dimensions or ranges thereof to which the invention is limited. However, to give some sense of scale that might be used in one non-limiting embodiment of the invention, some dimensions that might be used are given in Table I.

TABLE I

| Preliminary design parameters: | |
|---|---|
| Pitch | Triangular at 60° |
| Tube ID | 2 inch (5.1 cm) |
| Tube length | 1.5 feet (0.46 m) |
| Shell ID | 4.5 feet (1.4 m) |
| Total tube volume | 17.7 ft$^3$ (0.5 m$^3$) |

The present invention offers the polymerization art a simple and cost-effective method of bulk polymerization that is particularly, though not solely, applicable to producing superior quality polymers for use in preparing drag reducing agents. Because relatively precise control of the polymerization exotherm can be hereby achieved, production of polymer showing poor quality or poor performance can be minimized or avoided.

In one non-limiting embodiment the polymerization is carried out within a reaction chamber 12 of which at least about 75% of the inner chamber surface thereof, and in an alternate embodiment at least about 85%, and in still another non-limiting embodiment at least about 90% is an effective heat exchange surface. Thus, the reaction chamber 12 is effectively "lined" with such effective heat exchange surface.

Another important feature of the invention is the dimensional configuration of the reaction chambers 12. This configuration ensures relatively close proximity and/or direct contact of each portion of the polymerization mixture with the effective heat exchange surface, especially when a circular cross-section of the linear void space is used, which enables tight control of the temperature under which the polymerization occurs throughout the polymerization mixture. The result is superior quality product with a minimum of deviation in character and properties from those which can be predicted based on the desired polymerization temperature alone.

Generally, as noted, the cooling is provided by a flowing liquid or gas, optionally cooled external to the reactor 11, which is flowed in contact with the outer heat exchange surfaces, to enable removal of heat from the polymerization mixture contacting the chamber wall or tube 22. The coolant is preferably provided from a coolant source, external to the chamber, through appropriate flow conduits to contact and flow over the outer heat exchange surface of the chamber wall 22. Typical or conventional heat exchanger design and configuration can be advantageously employed as a model for construction of a chamber wall 22, with welds and other internal structures that can serve to route coolant flow to ensure intimate contact between the coolant and as much of the outer heat exchange surface of the chamber wall 22 as possible. Increasing contact time and rate of the coolant with the outer heat exchange surface on the shell side of the reactor 11 helps maximize heat removal from the polymerization mixture in contact with the inner chamber surface.

In the present invention, the effective heat exchange surface (wall 22) can be prepared from any of a variety of materials, and is preferably a material which is both adequately durable during the period of time it is in contact with the polymerization mixture that will be employed, and also exhibits a relatively high thermal conductivity. For example, stainless steel, glass, copper, brass, aluminum, combinations thereof, and the like are suitable. Preferably, such thermal conductivity is at least about 15 W/m-K. Such effective heat exchange surface can be polished or unpolished, but polished materials facilitate easier removal of the resulting solid polymers contacting the effective heat exchange surface. It is expected that in most embodiments of the invention, the reaction chambers 12 and reactor 11 would be reused, although in some non-limiting embodiments it may be that the chambers 12 and reactor 11 could be designed to be disposable.

Direct measurement of the temperature within a given polymerization mixture residing in a particular reaction chamber 12 can be accomplished via use of appropriate detection means, such as a thermocouple. However, in some non-limiting embodiments careful control of the temperature of a coolant circulated through the shell side of reactor 11, combined with knowledge common to those skilled in the art concerning the intended polymerization and its anticipated exotherm profile, is usually sufficient to ensure that the polymerization mixture's temperature through-out remains within the 5 degrees Fahrenheit (about 3 degrees Celsius) maximum variation, preferably with about 3° F. (about 2° C.), and in another non-limiting embodiment within about 2° F. (about 1° C.). Such control ensures a high degree of consistency in obtaining the desired molecular weight in the final polymer product or products. In another non-limiting embodiment, reaction temperature could be varied from 0° F. (−18° C.) to about 150° F. (about 66° C.) in order to generate a polymer with a broad molecular weight distribution, which is preferred in treating hydrocarbon fluids flowing through moderately long pipelines. In another non-limiting embodiment of the invention, the temperature can vary within a wider range, that is up to 80° F. (44° C.), that is, ±40° F. (±22° C.), as long as the limits of 0° F. (−18° C.) to about 150° F. (about 66° C.) are maintained. It is expected that this much wider temperature range, while easier to maintain and control that a 5° F. (about 3° C.) maximum variation, would result in a lower quality polymer, which may still be of use as a drag reducer in many applications.

In the method of the present invention, a polymerization mixture is introduced into the chamber's void space to undergo polymerization therein. Such introduction is preferably via a flowable connection, such as a simple conduit inlet or injection inlet and associated injection means, with a polymerization mixture source. Alternatively, more than one flowable connection 30 can be used, in order to enable simultaneous or stepped introduction of differing reactants, catalysts and co-catalysts that make up the polymerization mixture that polymerizes within the chamber. As noted, an additional connection 34 can be established for a purge gas, such as nitrogen, to remove water and other possible contaminants from the chamber immediately prior to introduction of the polymerization mixture, or alternatively, such a purge gas can be introduced via the same inlet 30 subsequently used for the polymerization mixture or component(s) thereof.

In the one particular non-limiting method of the present invention the polymerization mixture includes monomers selected for producing a polymer suitable for use as a DRA, although it will be appreciated that other types of polymers may be made with the method and apparatus of this invention. For DRA polymers, the monomers may be in one non-limiting embodiment any α-olefins ranging in carbon chain length from 2 to about 40, in one alternate embodiment from about 6 to about 12. Possible selections include, but are not necessarily limited to, 1-hexene, 1-heptene, 1-octene, 1-nonene, 1-decene, 1-dodecene, combinations thereof and the like.

Polymerization catalysts are preferably also employed in the polymerization mixture in order to produce DRA polymers. For this purpose, one or more Ziegler-Natta catalysts may be employed. In one particular non-limiting embodiment, these are transition metal chlorides, for example, a titanium chloride catalyst such as aluminum activated titanium trichloride.

Co-catalysts can also be effectively employed to produce DRA polymers. In combination with Ziegler-Natta catalysts, alkyl aluminum co-catalysts, including for example dialkyl aluminum chlorides and ethoxides can be very effective. These include, but are not necessarily limited to, in more specific examples, diethylaluminum chloride, diethylaluminum ethoxide, diisobutyl aluminum chloride, combinations thereof and the like.

Additional possible components for preparing DRA polymers include small quantities of solvent diluents to plasticize the drag reducing agent polymer. Such plasticizing materials, which may include, in non-limiting examples, kerosene, mineral oil and other hydrocarbons, including but not necessarily limited to synthetically produced isoparaffin fluids, serve to facilitate dissolution of the polymer in the hydrocarbon stream during use in a pipeline.

Once the components of the polymerization mixture have been selected, it is desirable to determine the order of mixing. Those skilled in the art will be easily able to determine an appropriate protocol for this procedure without extensive discussion herein. However, it is noted that the rate and uniformity of polymerization, and therefore also the polymerization's yield, are known to be heavily influenced by the degree of mixing. Mixing also affects the exotherm by promoting its uniformity and thereby eliminating isolated "hot spots", which promotes greater product consistency. In view of this, in one non-limiting embodiment the selected starting materials may be first contacted prior to their introduction into the reaction chamber. For example, it may be desirable to first mix all components in a stirred and jacketed reaction vessel in a batch. Thereafter the polymerization is preferably allowed to proceed for a short period of time, in one non-limiting instance from about 5 to about 30 minutes, as molecular weight begins to build. This reaction is evidenced by an initial, measurable viscosity increase. Once the viscosity has begun to increase, the polymerization mixture may be pumped into the reaction chamber(s) 12 until maximum volume is reached. This point is most easily discerned simply by stopping pumping once a small amount of polymerization mixture overflows from an overflow exit way or vent 32 leading out of the chamber, or alternatively until a pressure gauge located at the polymerization mixture inlet 30 indicates a sharp pressure increase therein.

In another non-limiting embodiment, an inlet conduit from each component source can be flowably connected at a junction point external to the reaction chamber. This embodiment ensures contact of all components, in appropriate proportion, prior to introduction into the chamber(s) 12. However, it relies upon the dynamics of flow alone to obtain a degree of mixing. Those skilled in the art will be able to easily determine whether this means of mixing will be adequate or appropriate for preparing the desired final product.

In still another non-limiting embodiment, each chamber 12 may be fitted with inlets 30 from each component source, for concurrent introduction of each component. Alternatively, one inlet may be used for all components, with an operator or robot progressively changing connections to the various component sources in a predetermined sequence.

Concurrently with the pumping of the polymerization mixture or of components thereof, coolant may be circulated through the shell side to contact the outer heat exchange surface of the chamber wall 22. Since DRA polymers are of the highest quality when the polymerization temperature is controlled throughout the polymerization within a range from about 0 to about 150° F. (about −18 to about 66° C.), in an alternate non-limiting embodiment from about 5 to about 40° F. (about −15 to about 4° C.), and in another non-limiting embodiment from about 20 to about 30° F. (about −6 to about −1° C.), it may be necessary or desirable to ensure that the coolant itself is introduced below or within the lower part of the selected temperature range. Coolant selection can be any fluid known in the art for this purpose. Preferably such fluid will be compatible with the construction components to which the coolant will be exposed, and preferably can be easily recycled for economic reasons. For example, chilled water, oils or other chilled or naturally cold liquids such as liquid nitrogen, gas coolants such as known refrigerants, and the like can be used. However, for producing DRAs, a particularly advantageous and inexpensive choice is a mixture of cold ethylene glycol and water.

In one non-limiting embodiment the residence time of the polymerization mixture within the reaction chamber may be from about 16 to about 30 hours. For most purposes this enables maximum polymer yield within reasonable commercial expectations. However, longer and shorter times may also be sufficient to accomplish preparation of the desired final polymer. Nonetheless, for DRA polymers in particular, a residence time of about 24 hours may be desirable.

Once it is determined that the polymerization reaction has proceeded to high conversion levels, which can be done by, in a non-limiting instance, probing of the hardness or "set" of the polymer in the chamber via an appropriate means, the polymer is ready to be harvested, as has been described using the harvesting plungers 38.

Since the polymer, which preferably has a hard, rubbery consistency, will be thereafter ground to enable it to be introduced into the liquid hydrocarbon being pumped, it is desirable to prevent its agglomeration. Thus, removal of the polymer into a collection bin 44 optionally containing an anti-agglomeration agent may be desirable. Possible anti-agglomeration agents include, but are not necessarily limited to, talc, alumina, silicones, mono- and polyunsaturated fatty acids having a high degree of unsaturation and salts of fatty acids having from about 12 to about 20 carbon atoms. Such anti-agglomeration agents also include, but are not necessarily limited to, alkali earth metal salts of such fatty acids, micronized polyethylene waxes, stearamide and bis-stearamide, and are generally in finely divided form or powders.

The polymer resulting from the practice of the present invention, particularly in the case of production of DRA polymers, may in one non-limiting embodiment of the invention have a conversion of greater than about 60 percent, alternatively more than about 70%, in another non-limiting embodiment more than about 80%, up to about 100%. With respect to DRA polymers, the product should be suitable for comminution, such as by grinding, using any means or method known to those skilled in the art. Following comminution it can be incorporated, either directly or in an aqueous or non-aqueous slurry further including alcohols, glycols, glycol ethers, mono- and poly-unsaturated fatty acids or mixtures thereof, into the hydrocarbon or other fluid stream where drag reduction is desired. Preferably this continuous phase is compatible with the liquid hydrocarbon which is to be treated with the DRA. Alternatively, polymers that are not destined to be used as DRAs can be appropriately processed to enable use in other desired applications.

The following example is provided to further illustrate the present invention and is not meant to be, nor should it be construed as being limiting in any way of its various embodiments.

EXAMPLE 1

A stainless steel pipe of 12" (30.5 cm) length and 1.5" (3.8 cm) diameter was chosen to simulate the heat exchanger tube or reactor. The inside of the pipe was coated with a thin layer of silicone release agent, polydimethylsiloxane fluid 200 of 1000 cP viscosity from Dow Corning. (Dow Corning 200 Fluids are polydimethylsiloxanes of different viscosities.) The pipe reactor was then capped off at one end. At the other end a pipe tee was installed to allow for purging the pipe reactor with nitrogen and filling the pipe reactor with reaction mixture. The pipe reactor was purged with nitrogen for 5 minutes by allowing nitrogen to sweep through the pipe reactor.

The pipe reactor was then charged with a reaction mixture similar to that shown in Example 1 of U.S. Ser. No. 10/373,361, incorporated herein by reference. This mixture was prepared by preparing a first mixture of about 1.37 g of aluminum-activated titanium trichloride (type C); about 1.21 g of diethylaluminum chloride; about 0.44 g of diethylaluminum ethoxide; and about 80 g of kerosene. Mixing was accomplished in a magnetically stirred round bottom flask and continued at 30° F. (−1.1° C.) for about 12 hours. A second mixture was prepared using about 955 g of 1-hexene and about 2230 g of 1-dodecene. The mixtures were then combined by continuously adding the first mixture, flowing at a rate of about 1 g per minute, to the second mixture, flowing at a rate of 53.2 g per minute at a temperature of about 30° F. (−1.1° C.).

The pipe reactor was charged with about 0.5 lbs (0.23 kg) of the total reaction mixture. The tee was then plugged off and the pipe reactor was immersed in a cold temperature bath at ~30° F. (about −1° C.) for further reaction. The pipe reactor was recovered 24 hours later for harvesting. The end fittings on the pipe reactor were removed. The reaction had proceeded to high conversion as evidenced by the rubbery texture of the polymer inside the pipe reactor.

To harvest the polymer a hydraulic press, Carver Laboratory Press Model C, was used. The pipe reactor was placed between the upper moveable plate and the lower stationary plate of the hydraulic press. A solid steel rod about 1.5" (3.8 cm) in diameter was inserted into the top opening of the pipe reactor and the steel rod rested against the top plate of the hydraulic press. Using the hydraulic pump, the top plate was slowly pushed down, which pushed the steel rod into the rubbery polymer. Slowly the polymer started to extrude out of the pipe reactor. The polymer was then simply pulled out of the pipe reactor. The pressure taken to extrude the polymer was very low and did not register on the pressure gauge. The lower marker on the pressure gauge was 200 psi (1400 kPa).

The inside of the pipe was inspected for effectiveness of the silicone release agent and found to be very clean without any polymer adhered. The polymer was then analyzed for conversion by removing the volatiles in a vacuum oven at 200° C. About 88% conversion was obtained, showing that high conversion was achievable in the pipe reactor. It is thus expected that the method and apparatus of this invention would function substantially as described and shown.

Many modifications may be made in the methods and apparatus of this invention without departing from the spirit and scope thereof that are defined only in the appended claims. For example, the exact number, design and configuration of reaction chambers may be different from those used here. In another non-limiting embodiment, the invention could be configured as a series of single reaction chambers 12, on a temperature controlled conveyor loop or each having a coolant jacket, on a conveyor line loop (somewhat analogous to a ketchup or soda bottle filling line). The reaction chamber or a jacketed, cooled reactor would be purged at a purge station, have release agent applied at an application station, filled with polymerization mixture at a fill station, be permitted to polymerize, come to a harvesting station to remove the polymer, be cleaned at an optional cleaning station, and then begin the cycle anew.

Alternatively, the reactor 11 herein could have a plurality of reaction chambers 12 in a circular shell configuration, where the shell rotates to bring reaction chambers 12 to a purge station, a release agent application station, a fill station, a cure station, an optional cleaning station, and then a harvesting station. The apparatus may have only one set of these six stations, or more sets arranged in a closed pathway, such as a circle. In another embodiment, the reactor 11 could be a square or rectangular shell with cylindrical reaction chambers. A clean and coat station would clean the reaction chambers (such as with the cleaning plungers previously described) and coat them with release agent. Next, the reactor 11 would be moved to an assembly station to install the bottom plate and to seal the second ends of the reaction chambers. At the following purge, fill and cure station the reactor 11 would be purged with nitrogen, filled with reaction mixture, sealed on the top ends, and set aside for the reaction to progress. The reactor 11 would then be moved to a harvest station where a single hydraulically driven steel plunger rod of appropriate diameter would extrude the polymer out onto a conveyor for further processing. The reactor then, would move to the clean and coat station to start another cycle. In this scenario, with sufficient number of reactors 11, one can harvest polymer from the reactors 11 in a continuous manner, thus leading the continuous production of downstream drag reducer products.

In another non-limiting embodiment of the invention, a harvesting plunger, a cleaning plunger, a release agent coater and a polymer filler applicator or nozzle would be mounted in a single rack above the reactor. The rack would move automatically, such as by remote control (Distributed Control System, DCS, or other mechanism) and indexed. There would not be any manual intervention during the process except for any preventative maintenance or repair. The steps involved in this embodiment would include, but not necessarily be limited to:

1. Polymer from each tube will be removed by the plunger and the rack would move by a tube width or reaction chamber 12 pitch (e.g. distance between linear axes of adjacent chambers 12) to the next registered position.
2. The cleaning plunger would clean the tube and the rack would move to the next index or registered position one pitch or tube width further along.
3. The release agent coater would apply release agent to the reactor chamber 12, and the rack would move again by a tube width to the next register position.
4. The polymer filler comes on top of the tube to fill the reactor chamber 12 with polymer and allowed to cure before the rack moves to harvest the polymer and begin the cycle again.

The speed of the rack movement would be determined by the maximum time the individual operation takes. In these automated non-limiting embodiments, it is expected that one limiting factor would be the polymer cure time.

Additionally, polymerization of materials other than those specifically mentioned may find utility in the apparatus and methods of this invention. Various combinations or sequences of introduction of materials besides those explicitly mentioned herein, are also expected to find utility in the apparatus of the invention.

We claim:

1. A method of preparing a polymer comprising:

allowing a polymerization mixture to polymerize in at least one closed reaction chamber configured as a linear void space with a linear axis and a cross-section and first and second ends, the linear void space surrounded by a chamber wall having an inner chamber surface and an outer heat exchange surface;

passing coolant over the outer heat exchange surface;

opening the ends of the reaction chamber; and removing essentially all of the polymer from each reaction chamber with a harvesting plunger traveling along the linear axis of the void space from the first end to the second end.

2. The method of claim 1 where the polymer is poly (alpha-olefin).

3. The method of claim 2 where the poly(alpha-olefin) is suitable for use as a drag reducing agent.

4. The method of claim 1 where the polymerization mixture comprises monomers selected from the group consisting of alpha-olefin monomers having a carbon chain length from 2 to 40.

5. The method of claim 1 where the polymerization mixture includes at least one alpha-olefin monomer, at least one Ziegler-Natta catalyst, and at least one alkyl aluminum co-catalyst.

6. The method of claim 1 where a polymerization temperature is from about 0 to about 150° F. (about −18 to about 66° C.), and the temperature does not vary by more than about 5° F. (about 3° C.), during the polymerization.

7. The method of claim 1 where a polymerization temperature is from about 0 to about 150° F. (about −18 to about 66° C.), and the temperature can vary by up to 80° F. (about 44° C.), during the polymerization.

8. The method of claim 1 further comprising prior to polymerizing, purging the reaction chamber with a gas or liquid inert to the polymerization.

9. The method of claim 1 further comprising prior to polymerizing, applying a release agent to the inner chamber surface.

10. The method of claim 9 where the release agent is selected from the group consisting of silicones, silicone emulsions, polyethylene glycols, polyethylene waxes, polytetrafluoroethylene dispersions, and sleeves made from polyethylene.

11. The method of claim 9 where the release agent is applied to the inner chamber surface with an application plunger.

12. The method of claim 1 where the harvesting plunger has a cross-section that mates with the uniform cross-section of the linear void space.

13. The method of claim 1 further comprising cleaning each reaction chamber with a cleaning plunger.

14. A method of preparing a polymer comprising:

purging at least one reaction chamber with a gas or liquid inert to the polymerization, the at least one reaction chamber configured as a linear void space with a linear axis and a cross-section and first and second ends, the linear void space surrounded by a chamber wall having an inner chamber surface and an outer heat exchange surface;

passing coolant over the outer heat exchange surface;

applying a release agent to the inner chamber surface;

allowing a polymerization mixture to polymerize in the at least one reaction chamber at a polymerization temperature;

opening the ends of the reaction chamber; and removing essentially all of the polymer from the at least one reaction chamber with a harvesting plunger traveling along the linear axis of the void space from the first end to the second end.

15. The method of claim 14 where the polymer is poly(alpha-olefin).

16. The method of claim 14 where the polymerization mixture comprises monomers selected from the group consisting of alpha-olefin monomers having a carbon chain length from 2 to 40.

17. The method of claim 14 where the polymerization mixture includes at least one alpha-olefin monomer, at least one Ziegler-Natta catalyst, and at least one alkyl aluminum co-catalyst.

18. The method of claim 14 where the polymerization temperature is from about 0 to about 150° F. (about −18 to about 66° C.), and the temperature does not vary by more than about 5° F. (about 3° C.), during the polymerization.

19. The method of claim 14 where the polymerization temperature is from about 0 to about 150° F. (about −18 to about 66° C.), and the temperature can vary by up to 80° F. (about 44° C.), during the polymerization.

20. The method of claim 14 where the release agent is selected from the group consisting of silicones, silicone emulsions, polyethylene glycols, polyethylene waxes, polytetrafluoroethylene dispersions, and sleeves made from polyethylene.

21. The method of claim 14 where the release agent is applied to the inner chamber surface with an application plunger.

22. The method of claim 14 where the harvesting plunger has a cross-section that mates with the cross-section of the linear void space.

23. The method of claim 13 further comprising cleaning each reaction chamber with a cleaning plunger.

24. An apparatus for preparing a polymer comprising:

at least one reaction chamber configured as a linear void space with a linear axis and a cross-section and first and second ends, the linear void space surrounded by a chamber wall having an inner chamber surface and an outer heat exchange surface, where the first and second ends may be opened and closed;

a shell surrounding the outer heat exchange surface for passing coolant over the outer heat exchange surface; and at least one harvesting plunger, where the harvesting plunger has a linear axis co-linear with the linear axis of the at least one reaction chamber, where the harvesting plunger travels within the corresponding void space from the first end to the second end along the axes to remove essentially all of an at least partially cured polymer from the chamber.

25. The apparatus of claim 24 where the cross-section of each reaction chamber is uniform along the linear axis.

26. The apparatus of claim 24 further comprising a plurality of reaction chambers where the linear axes of all chambers are parallel.

27. The apparatus of claim 26 further comprising a plurality of harvesting plungers.

28. The apparatus of claim 24 further comprising a first subsystem for purging each reaction chamber with a gas or liquid inert to the polymerization.

29. The apparatus of claim 24 further comprising a second subsystem for applying a release agent to the inner chamber surface of each reaction chamber.

30. The apparatus of claim 29 where the second subsystem comprises at least one application plunger, where the application plunger bears release agent and is designed to apply release agent to substantially the entire the inner chamber surface of a reaction chamber.

31. The apparatus of claim 24 where each harvesting plunger has a cross-section that mates with the uniform cross-section of the linear void space.

32. The apparatus of claim 24 further comprising at least one cleaning plunger.

33. An apparatus for preparing a polymer comprising:

at least one closed reaction chamber configured as a linear void space with a linear axis and a cross-section and first and second ends, the linear void space surrounded by a chamber wall having an inner chamber surface and an outer heat exchange surface, where the first and second ends may be opened and closed;

a shell surrounding the outer heat exchange surface for passing coolant over the outer heat exchange surface;

at least one harvesting plunger, where the harvesting plunger has a linear axis co-linear with the linear axis of the at least one reaction chamber, where the harvesting plunger travels within the corresponding void space from the first end to the second end along the axes to remove substantially all of an at least partially cured polymer from the chamber;

a first subsystem for purging each reaction chamber with a gas or liquid inert to the polymerization; and a second subsystem for applying a release agent to the inner chamber surface of each reaction chamber.

34. The apparatus of claim 33 where the cross-section of each closed reaction chamber is uniform along the linear axis.

35. The apparatus of claim 33 further comprising a plurality of reaction chambers where the linear axes of all reaction chambers are parallel.

36. The apparatus of claim 35 further comprising a plurality of harvesting plungers.

37. The apparatus of claim 33 where the second subsystem comprises at least one application plunger where the application plunger bears release agent and is designed to apply release agent to substantially the entire the inner chamber surface of a reaction chamber.

38. The apparatus of claim 33 where each harvesting plunger has a cross-section that mates with the cross-section of the linear void space.

39. The apparatus of claim 33 further comprising at least one cleaning plunger.

* * * * *